(12) United States Patent
Rother

(10) Patent No.: US 6,628,209 B1
(45) Date of Patent: Sep. 30, 2003

(54) VEHICLE IDENTIFIER WITH CONTACT-FREE READABLE ELECTRONIC DATA CARRIER, AND PRODUCTION PROCESS

(75) Inventor: Bernhard Rother, Fuerth (DE)

(73) Assignee: Siemens AG, Munich (DE)

( * ) Notice: Subject to any disclaimer, the term of this patent is extended or adjusted under 35 U.S.C. 154(b) by 0 days.

(21) Appl. No.: 09/549,596

(22) Filed: Apr. 14, 2000

Related U.S. Application Data

(63) Continuation of application No. PCT/DE98/02893, filed on Sep. 30, 1998.

(30) Foreign Application Priority Data

Oct. 14, 1997 (DE) .......................................... 197 45 263
Oct. 21, 1997 (DE) .......................................... 197 46 389

(51) Int. Cl.$^7$ ................................................. G08G 1/01
(52) U.S. Cl. ............... 340/933; 340/693.5; 340/825.34; 340/941; 340/928; 40/200; 40/202
(58) Field of Search ............................... 340/933, 693.5, 340/825.34, 941, 928; 40/200, 202

(56) References Cited

U.S. PATENT DOCUMENTS

| | | | | | |
|---|---|---|---|---|---|
| 4,001,822 A | * | 1/1977 | Sterzer | ................... | 343/6.5 SS |
| 5,381,618 A | * | 1/1995 | Singleton | ..................... | 40/202 |
| 5,404,664 A | * | 4/1995 | Brooks et al. | ................. | 40/202 |
| 5,657,008 A | * | 8/1997 | Bantli | ......................... | 340/933 |
| 5,870,841 A | * | 2/1999 | Brody, II et al. | .............. | 40/200 |
| 5,913,543 A | * | 6/1999 | Curiel | ........................ | 283/94 |
| 6,025,784 A | * | 2/2000 | Mish | ....................... | 340/693.5 |

FOREIGN PATENT DOCUMENTS

| | | |
|---|---|---|
| DE | 41 03267 | 9/1992 |
| EP | 0 040 839 | 12/1981 |
| EP | 0 648 653 | 4/1995 |
| WO | WO96/36030 | 11/1996 |
| WO | WO96/36031 | 11/1996 |

* cited by examiner

Primary Examiner—Daniel J. Wu
Assistant Examiner—Tai T. Nguyen
(74) Attorney, Agent, or Firm—Sughrue Mion, PLLC

(57) ABSTRACT

A vehicle identifier having a substantially flat carrier with at least one labeling field and an identification to identify a vehicle. The identification is applied on the at least one labeling field. An electronic data carrier carries data associated with the identification and is mounted on the identification carrier. The data are at least readable by a reading device in a contact-free manner. A process for manufacturing a vehicle identifier includes, in a first step, adhering an electronic data carrier carrying data associated with an identification to identify a vehicle to a protective covering. Furthermore, the electronic data carrier is applied onto an identification carrier such that the electronic data carrier is sandwiched between the protective covering and the identification carrier.

28 Claims, 4 Drawing Sheets

VEHICLE IDENTIFIER WITH CONTACT-FREE READABLE ELECTRONIC DATA CARRIER, AND PRODUCTION PROCESS

This is a Continuation of International Application PCT/DE98/02893, with an international filing date of Sep. 30, 1998, the disclosure of which is incorporated into this application by reference.

The invention relates to new and useful improvements in vehicle identifiers, in particular for automobiles, motorcycles, trucks, and buses.

FIELD OF AND BACKGROUND OF THE INVENTION

Vehicle identifiers have, for a long time, represented objects which are exposed to impermissible actions, such as manipulations and falsifications. Thereby, in particular the correspondence of vehicle identifiers to vehicle and owner is subject to the most various forms of manipulation. A possible form of such manipulation is providing a vehicle with an identifier which is actually intended for another vehicle, in particular, of another owner.

To uncover these types of manipulation, it has previously been necessary to manually compare the information on the identifier to the contents of associated official documents relating to the identifier, such as a so-called vehicle registration certificate or other documents issued by an agency. Since these documents are in the possession of individuals, such comparisons can only be randomly performed by very extensive identity checks.

From International Laid-Open Application WO 96/36031, an electronic identification system is known. This system includes a vehicle identifier part which has optically readable information and a data carrier for electronically processible information. Furthermore, the system includes an identifier holding part which has an electronic module with signal processing electronics, radio frequency electronics, and, if necessary, a power supply. After inlaying the vehicle identifier part into an identifier holding part, which is fastened to a vehicle, the system is functional. Data from the data carrier can, for example, be read by the electronic module.

The problem of error-free and quick correlation of the content of the associated official documents to, for example, vehicle and owner, and the problem of an identification to be provided on the identifier already arise in the manufacturing of the identifiers. These documents, as a rule, are issued by an agency. It has been customary until now that the identification provided by an agency for inscription on the identifier is registered by an individual and input manually, for example, in an embossing machine. Alternatively, it has been customary for the individual to cause the selection and compilation of respective embossed identifiers.

From European Patent Application EP 0 648 653, a device and a process for identification of vehicles which is protected from manipulation are known. Therein, a comparison between data which is stored in an on-board computer, data of an electronic identifier and data on a separate data carrier is performed by the on-board computer. This process is extensive and prone to error.

An error-free and quick correlation of the inscription on a vehicle identifier to, for example, the content of the associated official documents of the vehicle in question or to other associated data sets of, for example, the vehicle owner in question, can also be advantageous in the most varied other applications. A correlation of this type can occur, for example, to register the use of toll-roads or parking garages requiring a fee. Such a correspondence can also occur, in the case of an access control device for garages, at gates and in many other applications.

OBJECTS OF THE INVENTION

It is one object of the invention to specify a vehicle identifier, for which a correlation of identifications on the vehicle identifier or of identifications provided for the vehicle identifier to the contents of associated data sets is simpler than previously possible.

SUMMARY OF THE INVENTION

According to one formulation, the invention is directed to a vehicle identifier having a substantially flat carrier with at least one labeling field and an identification to identify a vehicle. The identification is applied on the at least one labeling field. An electronic data carrier carries data associated with the identification and is mounted on the identification carrier. The data are at least readable by a reading device in a contact-free manner.

According to another formulation, the invention is directed to a process for manufacturing a vehicle identifier which includes, in a first step, adhering an electronic data carrier carrying data associated with an identification to identify a vehicle to a protective covering. Furthermore, the electronic data carrier is applied onto an identification carrier such that the electronic data carrier is sandwiched between the protective covering and the identification carrier.

BRIEF DESCRIPTION OF THE DRAWINGS

The invention and further advantageous refinements thereof are explained in more detail below with the aid of diagrammatic, exemplary embodiments in the drawings. The figures show.

DETAILED DESCRIPTION OF THE PREFERRED EMBODIMENTS

Figure 1:
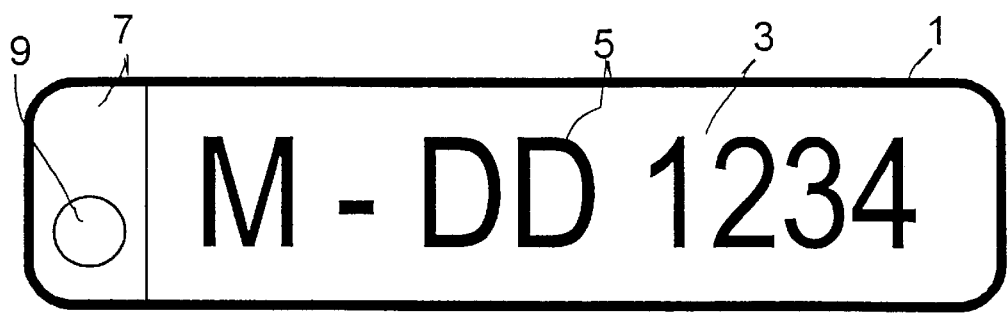
FIG. 1 a top view of a vehicle identifier according to the invention.

FIG. 1 shows a top view of an exemplary vehicle identifier according to the invention. A flat identification carrier 1 serves as a base body, which, as a rule, has the form of a shield. The identification carrier 1 can be produced from the most varied materials. In particular, it can be made of a metal such as aluminum. However, plastic materials are also suitable.

The identification carrier 1 has at least one labeling field 3 which serves for the application of a vehicle identification 5. In FIG. 1, an exemplary identification M-DD 1234 is applied. This identification can in particular be applied by an embossing of the identification carrier 1, but also by gluing the respective combinations of letters and numbers. Furthermore, the vehicle identifier according to the invention has an electronic data carrier 9 which is at least readable in a contact-free manner and applied to the flat identification carrier 1.

By bringing a reading device, which is not shown in the figures, into the vicinity of the electronic data carrier, data contained in the data carrier can be read out in a contact-free manner, in particular by an inductive data transmission link. This data will, in general, be associated with the identification applied on the identifier. Also, this data can be, in an arbitrary manner, further processed in machine-readable form in external data processing units. The invention offers the advantage that this data can be registered without the interposition of an individual. This registration is free of errors and in coded, machine-readable form. It is possible to correlate the data, for example, to the labeling located on the identifier or to other data sets. It is also possible to mount a contact-free read-write data carrier on the identification carrier 1. With appropriate external writing and reading devices, data can be written, in a contact-free manner, onto the data carrier and read out, again in a contact-free manner, from the data carrier.

As shown in the embodiment of FIG. 1, the flat identification carrier 1 of the vehicle identifier advantageously has, along with the actual labeling field 3, an additional free area 7. This area is not provided for the application of labeling. It is in particular advantageous to mount the electronic data carrier 9 on the free area 7 when the respective identification is applied by embossing the identification carrier 1.

Figure 3:
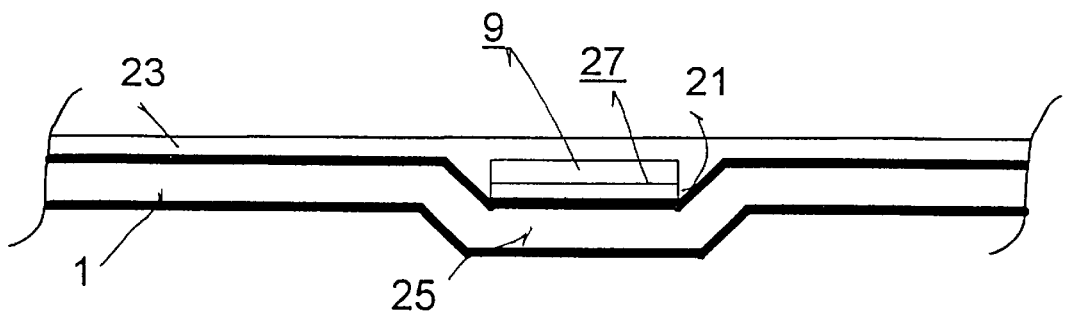
FIG. 3 an extracted sectional representation through another embodiment of the invention, FIG. 4 a top view of a first embodiment of an electronic data carrier for vehicle identifiers according to the invention, FIG. 5 a sectional representation through the exemplary electronic data carrier of FIG. 4, FIG. 6 a sectional representation through an area of a vehicle identifier with an electronic data carrier according to the embodiment of FIGS. 4 and 5, FIG. 7 a top view of a vehicle identifier according to the invention with a second embodiment of an electronic data carrier, FIG. 8 a sectional representation through the exemplary electronic data carrier of FIG. 7, and FIG. 9 an extracted sectional representation through a vehicle identifier according to another embodiment of the invention.

In a further embodiment of the invention, shown in the extracted sectional representation of FIG. 3, the flat identification carrier 1 can have an additional receiving recess 25 in which, advantageously, the electronic data carrier 9 is mounted.

In a further embodiment of the invention, it is advantageous if an additional flat shielding element 21 for electromagnetic decoupling is mounted at least between an underside of the electronic data carrier and an upper side of the identification carrier. This embodiment is particularly advantageous if the flat identification carrier 1 consists of an electrically conducting material, in particular a metal.

Figure 2:
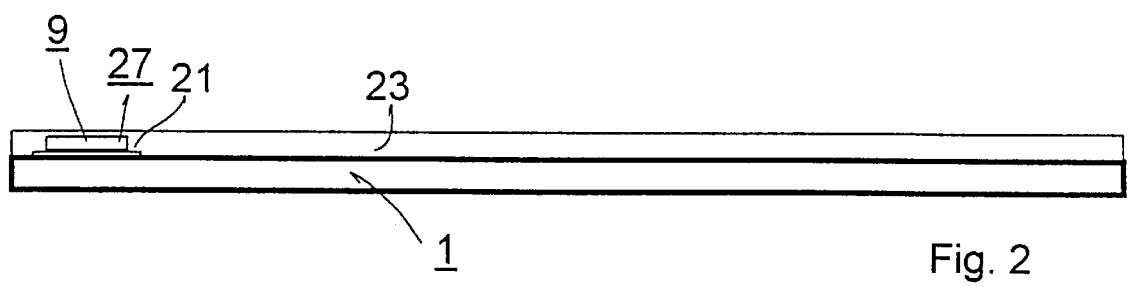
FIG. 2 a sectional representation through the vehicle identifier of FIG. 1.

In the sectional representations through a vehicle identifier according to the invention, as shown in FIGS. 2 and 3, the flat shielding element 21 is already sandwiched between the electronic data carrier 9 and the identification carrier 1. By such a shielding element, the design of a data transmission link to an external read-write device can be simplified. In particular, the coverage of the data transmission link, which is particularly an inductive data transmission link, can be significantly increased. The external read-write device is not shown. The shielding element causes an electromagnetic decoupling of generally present antennas of the data carrier from the identification carrier serving as a metallic foundation.

The flat shielding element 21 can advantageously be a plastic carrier which, if necessary, additionally contains ferritic material. It is particularly advantageous, if the flat shielding element 21 is embodied as a flexible foil of a composite of at least plastic and ferritic material. In the examples of FIGS. 2 and 3, the data carrier 9 is accommodated with all its elements in an additional housing 27. In this case, the shielding element can be mounted on the underside of the housing 27. In another embodiment, the shielding element can even represent the housing underside itself or be integrated into the housing.

According to a further embodiment, which is also already represented in the examples of FIGS. 2 and 3, the vehicle identifier can have an additional protective covering 23 which completely covers the flat identification carrier 1 with the electronic data carrier 9 located thereon. The protective covering can be embodied as a light-reflecting foil as a self-adhering foil, or as a combination of both. Particularly, if the protective covering is self-adhering, the manufacturing of the vehicle identifier according to the invention is significantly simplified. In a first manufacturing step, the electronic data carrier can be brought into an adhering connection to the underside of the protective covering. Only in a second step is the protective covering with the interposed electronic data carrier mounted on the flat identifier. This embodiment is particularly suitable for data carriers without a housing. The essential elements of these data carriers, in particular an electronic processing unit 11 at least for receiving and storing data and an antenna 13 connected thereto, are loose, that is, not in a fixed spatial arrangement to one another. Such data carriers without a housing can be disposed on a separate carrier material. These data carriers are removed from the carrier material in the above-cited first step of manufacturing the adhesive connection for the self-adhering protective covering 23. It is advantageous if, only after application of the data carriers with or without housing, the identification 5 is applied to the labeling field 3, for example by embossing.

In the examples of FIGS. 2 and 3, the data carrier 9 is housed with all its elements in the additional housing 27. It contains, in general, at least the electronic processing unit and the antenna. The antenna allows for at least a reception of data which is at least stored in the electronic processing unit.

Figure 4:
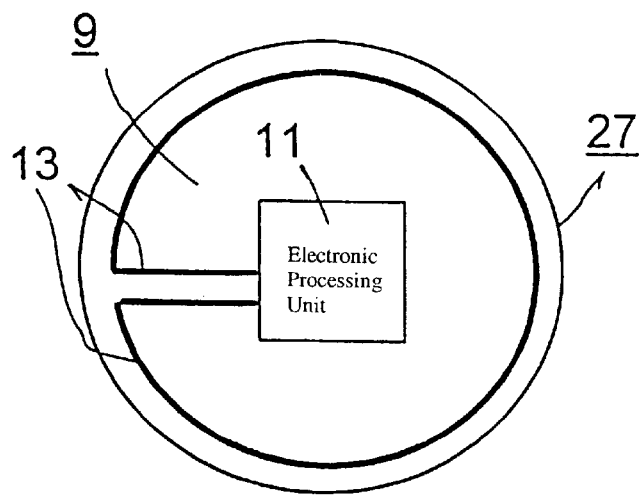
Figure 5:
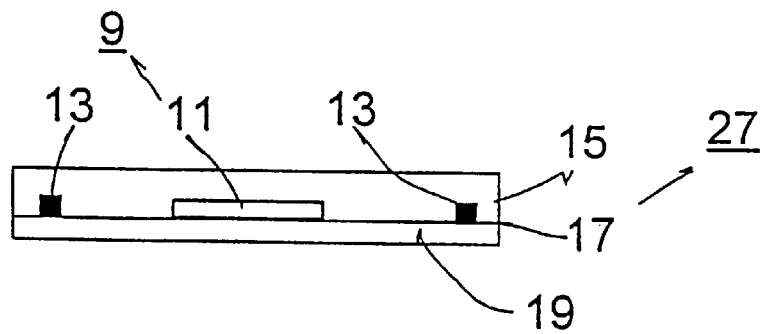

FIG. 4 and FIG. 5 show a top view of and a section through a first embodiment of an electronic data carrier, respectively, which is usable for vehicle identifiers according to the invention. The electronic data carrier includes, as its main components, at least the electronic processing unit 11 and the approximately ring-shaped encircling antenna 13 in the form of a line connected thereto. In an embodiment of a data carrier without a housing, these components can be laid on a paper-type carrier material in a, for example, removable manner.

Figure 6:
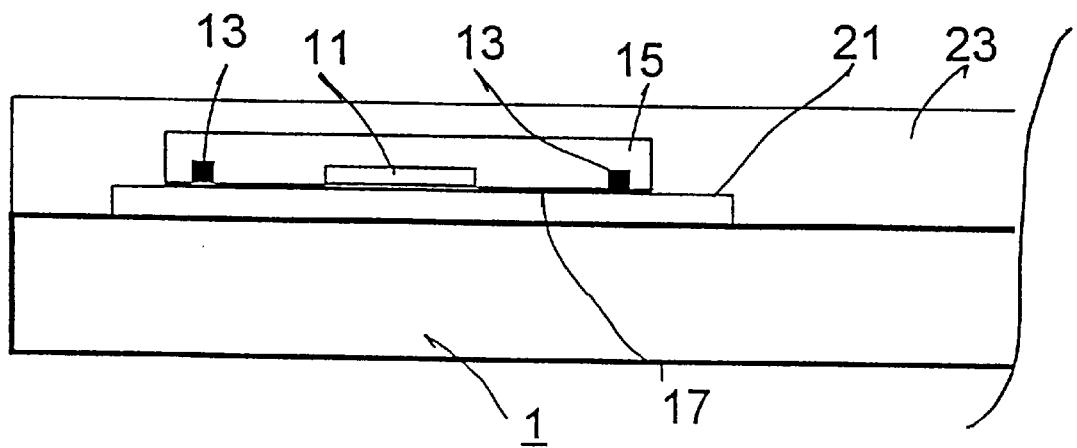

In the embodiments for the electronic data carrier for the vehicle identifiers shown in FIGS. 4, 5 and 6, at least the electronic processing unit 11 and the antenna 13 connected thereto are accommodated in the housing 27. According to the sectional representation of FIG. 5 through the exemplary electronic data carrier of FIG. 4, the housing advantageously has an adhesive underside 17 by which the data carrier 9 can be applied onto the flat identification carrier 1 or the flat shielding element 21. The adhesive underside 17 is advantageously covered with a protective covering 19, in particular of a wax paper type, at some point before the electronic data carrier 9 is mounted onto the flat identification carrier 1. The protective covering 19 is removed when the data carrier 9 is mounted onto or into the flat identification carrier 1.

Advantageously, the housing 27 of the electronic data carrier is formed by a self-adhering foil. In this case, the housing 27, advantageously, has the form of a plaque or token with approximately the size of a coin. Such an embodiment has already been shown in the examples of FIGS. 1, 4, 5 and 6. A data carrier designed in this manner is particularly simply mountable in that the data carrier is glued, much in the same manner as a label, to the surface of the identifier. In particular, the gluing is performed before covering the identifier 1 with the protective covering 23 which is, preferably, a reflecting foil.

FIG. 6 shows a sectional representation through that area of the vehicle identifier which is covered with the electronic data carrier according to the embodiment of FIGS. 4 and 5. Therein, the antenna 13 and the processing unit 11 of the data carrier 9 are supported by a housing 15 formed, advantageously, as an adhesive foil. Via its adhesive underside 17, the coin-like arrangement of the elements 11, 13, 15 is mounted, with the flat shielding element 21 interposed, on the upper side of the identification carrier 1. Finally, all the elements are covered by the protective covering 23 which is, preferably, a non-transparent reflecting foil. The extract represented in FIG. 6 is preferably located in the free area of the identification carrier.

Figure 7:
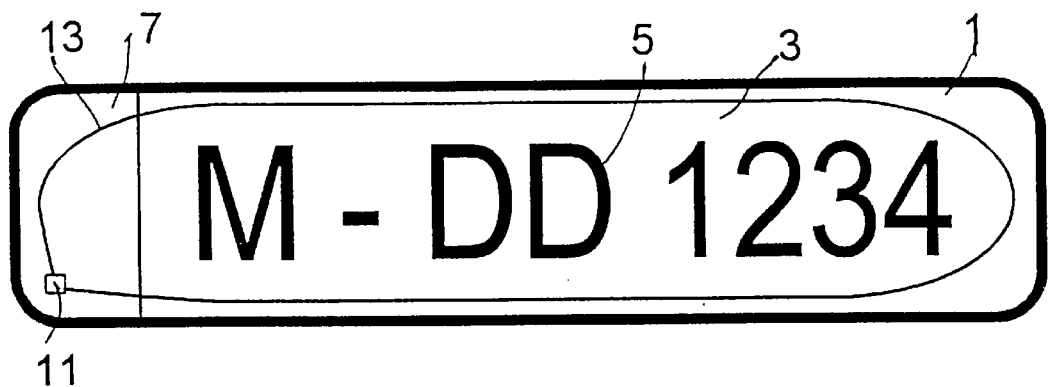
Figure 8:
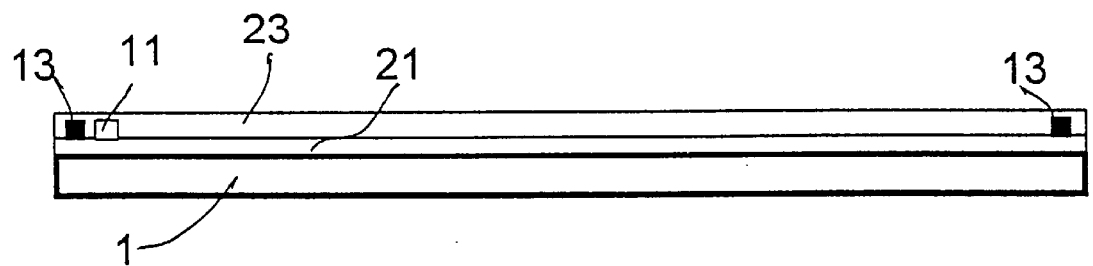

Finally, FIG. 7 shows a top view of a further embodiment for the vehicle identifier according to the invention with a second embodiment of the electronic data carrier. FIG. 8 shows the corresponding sectional representation. Therein, the antenna 13 of the electronic data carrier is advantageously adapted in size and form to the flat identification carrier 1. Advantageously the processing unit 11 is once again disposed in the free area 7 which does not have the identification 5. The line of the antenna connected to the processing unit 11 encircles the labeling field 3 and the sample labeling M-DD 1234 thereon in a ring-shaped manner. An arrangement of this type allows for a further enhancement in the range of the data transmission link between the antenna 13 and the external read-write device. In particular, this data transmission link is an inductive link. Advantageously, in such an embodiment, the flat shielding element 21 covers approximately the entire flat identification carrier 1. This type of large-surface electronic data carrier, that is, at least its electronic processing unit and the antenna 13 connected thereto, are advantageously removably mounted on the adhesive underside 17. Thereby, application of the data carrier, for example either on the surface of the identification carrier or, for example, on the inner side of a self-adhering protective covering 23, is simplified.

Figure 9:
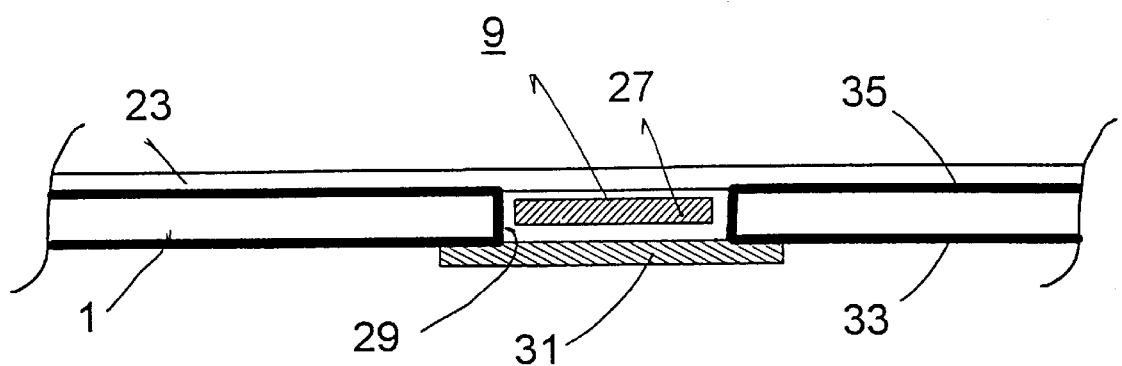

FIG. 9 shows a further embodiment for applying the electronic data carrier to the vehicle identifier. Therein, the identification carrier 1 has a receiving opening or sheet metal recess 29, in particular produced by drilling or stamping, which serves for accommodating the data carrier. Advantageously, the dimensions of the recess are adapted to the size of the data carrier. Furthermore, the thickness of the data carrier is advantageously adapted to the depth of the recess, that is, to the material strength of the identification carrier. The data carrier can be laid, clamped, glued, or fastened in another manner in the receiving opening.

This arrangement has the advantage that the identification carrier can already be provided with the receiving opening 29 as a blank during production. Possible further production steps can be performed independently of whether the data carrier 9 is already laid in the receiving opening 29 or not. In particular, the application of the protective covering 23, preferably in the form of a non-transparent, self-adhering reflecting foil, and the application of the identification on the labeling field can be performed first, and the data carrier may be mounted in the recess only after conclusion of all essentially mechanical processing of the vehicle identifier. Advantageously, a front side 35 of the vehicle identifier remains completely plane. If the front side 35 is covered with the protective covering, then no arching occurs in the area of the opening. Advantageously, the receiving opening can be sealed, after laying in the data carrier 9, by a covering 31 applied on a back side 33 of the identification carrier 1. Also, the receiving opening can be protected against mechanical influences.

An advantage of the embodiment of the invention in FIG. 9 lies in the fact that the data carrier is surrounded only laterally by the material of the identification carrier. The foundation of a flat shielding element under the data carrier is not required even when the identification carrier is made of metal. Through an appropriate dimensioning of the receiving opening in comparison to the dimensions of the data carrier, a sufficient lateral decoupling from surrounding metallic parts can be achieved.

Accordingly, in the production of this type of vehicle identifier, the identification carrier is advantageously at first provided with the receiving opening. Thereafter, the additional protective covering can be adhesively applied to the front side 35 of the identification carrier so that the receiving opening is covered completely. Further processing steps can follow, in particular the application of the identification to the labeling field. Finally, the electronic data carrier can be laid into the receiving opening from the flat identification carrier's back side 33, which is not provided with the protective covering. Finally, in a further step, the receiving opening 29 on the back side 33 of the identification carrier can be provided with the covering 31.

The particular advantage of this embodiment of the invention lies in the capability of retroactive insertion of the data carrier. The vehicle identifier can, as before, be produced without regard to the data carrier. The data carrier can be mounted retroactively, for example, in an agency permit center for motor vehicles. The receiving opening can be sealed from the back side in a manner secure against falsification. If the sealing is performed using non-metallic materials, then the data carrier can be, in a contact-free manner, read from both sides of the vehicle identifier in an inductive way. In this case, the data carrier can also be written with data.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A vehicle identifier, comprising:
    a substantially flat identification carrier having at least one labeling field on an outer surface of the identification carrier and an identification to identify a vehicle, the identification being applied on the at least one labeling field; and
    an electronic data carrier carrying data associated with the identification and mounted on the outer surface of the identification carrier, the electronic data carrier comprising:
        at least one electronic processing unit to at least receive and store the data associated with the identification, the data being at least readable by a reading device in a contact-free manner;

an antenna connected to the electronic processing unit; and a housing to at least accommodate the electronic processing unit and the antenna.

2. The vehicle identifier according to claim 1, wherein the identification is embossed on the at least one labeling field.

3. The vehicle identifier according to claim 1, wherein the identification carrier further comprises a free area on which the electronic data carrier is mounted.

4. The vehicle identifier according to claim 1, wherein the identification carrier further comprises:

an electrically conducting material;

an antenna connected to the electronic data carrier; and a substantially flat shielding element mounted between the identification carrier and the electronic data carrier to electromagnetically decouple the antenna from the identification carrier.

5. The vehicle identifier according to claim 4, wherein the electrically conducting material of the identification carrier comprises a metal.

6. The vehicle identifier according to claim 4, wherein the shielding element covers the identification carrier substantially entirely.

7. The vehicle identifier according to claim 4, wherein the shielding element comprises ferritic material.

8. The vehicle identifier according to claim 7, wherein the shielding element comprises a flexible foil of a composite of at least a plastic material and the ferritic material.

9. The vehicle identifier according to claim 1, further comprising a protective covering to cover the identification carrier and the electronic data carrier.

10. The vehicle identifier according to claim 9, wherein the protective covering to cover the identification carrier and the electronic data carrier comprises a light-reflecting protective covering.

11. The vehicle identifier according to claim 9, wherein the protective covering to cover the identification carrier and the electronic data carrier comprises a self-adhering protective covering.

12. The vehicle identifier according to claim 1, wherein the housing of the electronic data carrier has an adhesive underside to mount the electronic data carrier on the outer surface of the identification carrier.

13. The vehicle identifier according to claim 12, wherein the housing of the electronic data carrier consists essentially of a self-adhering foil.

14. The vehicle identifier according to claim 12, wherein the housing of the electronic data carrier comprises a plaque with substantially the size of a coin.

15. The vehicle identifier according to claim 12, wherein the at least one electronic processing unit and the antenna are removably mounted in the housing.

16. The vehicle identifier according to claim 1, wherein the size and form of the antenna is adapted to the size and form of the identification carrier.

17. The vehicle identifier according to claim 1, wherein the identification carrier further comprises a receiving opening into which the electronic data carrier is mounted.

18. The vehicle identifier according to claim 17, wherein the electronic data carrier is fully recessed into the receiving opening.

19. The vehicle identifier according to claim 17, further comprising a protective covering to cover the identification carrier and the electronic data carrier.

20. The vehicle identifier according to claim 19, wherein the protective covering to cover the identification carrier and the electronic data carrier comprises a light-reflecting protective covering.

21. The vehicle identifier according to claim 19, wherein the protective covering to cover the identification carrier and the electronic data carrier comprises a self-adhering protective covering.

22. The vehicle identifier according to claim 17, further comprising a covering provided on a back side of the identification carrier to cover the receiving opening.

23. The vehicle identifier according to claim 1, wherein the identification carrier further comprises a receiving recess, in which the electronic data carrier is mounted.

24. A process for manufacturing a vehicle identifier, comprising:

(a) adhering an electronic data carrier carrying data associated with an identification to identify a vehicle to at least one of a light-reflecting protective covering and a self-adhering protective covering; and (b) applying the electronic data carrier connected to the at least one of the light-reflecting protective covering and the self-adhering protective covering onto an identification carrier such that the electronic data carrier is sandwiched between the at least one of the light-reflecting protective covering and the self-adhering protective covering and the identification carrier.

25. The process according to claim 24, further comprising applying the identification to identify the vehicle on a labeling field of the identification carrier.

26. The process according to claim 24, further comprising removing the electronic data carrier, which has no housing, from a carrier material before the adhering step (a).

27. A process for manufacturing a vehicle identifier, comprising:

(a) providing a substantially flat identification carrier with a receiving opening;

(b) adhering a protective covering to a front side of the identification carrier such that the receiving opening is covered;

(c) applying an identification to identify a vehicle on a labeling field of the identification carrier; and (d) from a back side of the identification carrier which is not covered by the protective covering, laying an electronic data carrier carrying data associated with the identification into the receiving opening.

28. The process according to claim 27, further comprising sealing the receiving opening on the back side of the identification carrier with a covering.

* * * * *